United States Patent [19]

Marks et al.

[11] Patent Number: 5,546,517
[45] Date of Patent: Aug. 13, 1996

[54] APPARATUS FOR DETERMINING THE STRUCTURE OF A HYPERMEDIA DOCUMENT USING GRAPH PARTITIONING

[75] Inventors: Joseph W. Marks, Belmont; Stuart M. Shieber; Rebecca P. Hwa, both of Cambridge, all of Mass.

[73] Assignee: Mitsubishi Electric Information Technology Center America, Inc., Cambridge, Mass.

[21] Appl. No.: 350,656

[22] Filed: Dec. 7, 1994

[51] Int. Cl.$^6$ .............................. G06F 17/27; G06F 17/30
[52] U.S. Cl. .................... 395/145; 395/160; 364/282.2; 364/283.2
[58] Field of Search ................... 395/145–148, 395/160, 50; 364/282.2, 282.3, 282.4, 283.2, 283.3

[56] References Cited

U.S. PATENT DOCUMENTS

| | | | |
|---|---|---|---|
| 3,617,714 | 11/1971 | Kernighan et al. | 364/488 |
| 4,912,656 | 3/1990 | Cain et al. | 364/514 C |
| 4,914,586 | 4/1990 | Swinehart et al. | 395/600 |
| 4,982,344 | 1/1991 | Jordan | 395/157 |
| 5,241,673 | 8/1993 | Schelvis | 395/600 |
| 5,251,147 | 10/1993 | Finnerty | 364/490 |
| 5,333,237 | 7/1994 | Stefanopoulos et al. | 395/12 |
| 5,367,621 | 11/1994 | Cohen et al. | 395/154 |
| 5,444,842 | 8/1995 | Bentson et al. | 395/161 |
| 5,446,891 | 8/1995 | Kaplan et al. | 395/600 |
| 5,452,468 | 9/1995 | Peterson | 395/800 |

*Primary Examiner*—Heather R. Herndon
*Assistant Examiner*—Stephen Hong
*Attorney, Agent, or Firm*—Robert K. Tendler, Esq

[57] ABSTRACT

Apparatus for determining the structure of a hypermedia document containing text and graphics that are to be laid out on several linked pages includes a system that specifies the assignment of text and graphics to pages and the links between the pages via a reduction to graph partitioning and the use of optimization techniques for graph partitioning. In one embodiment, display items and relations between these display items are listed along with a measure of their importance. These factors are captured in terms of numeric weights for edges between nodes in the associated graph to permit the system to assign display items to pages, and determine which pages should be linked, so that a user can move between pages in the most efficient manner. In a further embodiment, to accommodate limited display area that restricts the number of display items and page links that can be displayed simultaneously, the system can take into account multistage page moves that allow the user to access display items on different pages in sequence by moving from one page to another via links on other pages, through the use of "stepping-stone" nodes in the associated graph that record possible traversal routes in the document that are not represented in other formulations of the hypermedia-document-layout task.

8 Claims, 4 Drawing Sheets

MAXIMUM
PAGE SIZE = 7

NAVIGATIONAL
LINK SIZE = 1

APPARATUS FOR DETERMINING THE STRUCTURE OF A HYPERMEDIA DOCUMENT USING GRAPH PARTITIONING

FIELD OF THE INVENTION

The invention relates to structuring hypermedia documents in a near-optimal manner, and more particularly to a system for providing a near-optimal assignment of information to pages and near-optimal page linking for efficient navigation of the document.

BACKGROUND OF THE INVENTION

Hypermedia documents are computer-based documents that contain text and graphics on pages that are connected via navigational links or buttons. Hypermedia documents constitute an alternative to the book that permits nonsequential access to pages. Embedded hypermedia documents are also found in many user interfaces, such as aircraft cockpits, power- and industrial-plant control consoles, information kiosks, automated teller machines, videocassette recorders, and many other systems. In all such instances, the problem of designing a hypermedia document involves two key tasks: assigning information to particular pages, and determining how the pages are linked. These tasks should be done so as to facilitate the efficient traversal of the document by users.

For instance, the multifunction display, MFD, in an aircraft cockpit is a hypermedia document that contains important flight data and controls that cannot fit on the pilot's control panel. A typical MFD contains 20–100 linked pages of information, ideally linked so that the pilot can quickly access the information he needs in a wide variety of normal and abnormal operational situations. Since the information is provided to the pilot on a single CRT display, it is often with difficulty that a designer of MFDs can arrive at appropriate content and efficient linkage of the pages of information presented to the pilot.

In the past, designers have provided such structure and links on an ad hoc basis in which the structure and links are specified manually. The problem with such manual procedures is that they are inordinately time-consuming and often result in grossly non-optimal presentations. For instance, when more than 100 pages of information are to be displayed, it may take several man months to create a prototype hypermedia document for use as a cockpit MFD. Thereafter, the prototype is tested for convenience by the potential users of the system to ascertain the level of convenience provided by the prototype, which may then require iterative refinement and improvement.

Because there are no computer-aided functions that can be applied to the design of such MFDs, there is often no rigorous accounting for the relative importance of information or for flexible ordering of the presentation of information, much less a system for optimizing the document structure.

This problem is also severe not only for cockpit MFD design, but also the design of information kiosks like automated teller machines, ATMs, in which the user must oftentimes page through irrelevant screens to get to the screen containing information that he currently wants. For instance, an individual wishing to check his account balance must typically page through three to four screens to access the information.

Moreover, books are prepared as linear documents in which the paging sequence is fixed. This type of linear format is nonoptimal, especially for texts with multiple intrinsic cross references, because the linear format does not permit the user to be presented with information from different portions of the book in a different order that is both more convenient and that provides the information in a customized manner related to relevance. This and other problems described above are all hypermedia-document-structuring tasks that are addressed by the Subject System.

SUMMARY OF THE INVENTION

In accordance with the present invention, a system is provided for automatically specifying the page content and links between pages for a hypermedia document. In so doing, the system provides a near-optimal structure for a given document by reducing the structuring task to the problem of partitioning a graph with near optimality. In one embodiment, an analysis is performed to ascertain how the user will access the information relevant to his task. From this analysis, a list of display items and numbers that reflect the importance and frequency of movement between display items on different pages or the same page is mapped onto a graph: the display items map to nodes in the graph, and the numbers to cumulatively weighted edges. Each edge in the graph therefore has associated with it a weight reflecting the desirability of having the two display items associated with the graph nodes connected by that link on the same page. The weighting may reflect the criticality of having the display items on the same page, the frequency with which the display items are accessed sequentially, and other designer-specified importance factors.

A modification to the graph is made with the intent of permitting movement from one display item to another that requires traversal through a page or pages which do not contain either display item. This is accomplished through the utilization of additional nodes in the associated graph, referred to herein as stepping-stone nodes. Each edge in the original graph, corresponding to a relation between a pair of display items, is split in two to accommodate the interposition of one or more stepping-stone nodes. This permits the modified graph to account for indirect movement from display item to display item via another page containing neither display item, which is not otherwise captured or represented by the original single unbroken edge.

After having derived the graph, graph partitioning is accomplished by using standard graph-partitioning algorithms which results in the assignment of display items to pages and the establishment of links between the pages. In one embodiment, the graph is partitioned by one of the most common partitioning systems, described by Kernighan and Lin in U.S. Pat. No. 3,617,714, incorporated herein by reference. Here, a method of partitioning the nodes of a graph into sets utilizes constraints on the maximum number of sets, the maximum number of nodes that can be assigned to a particular set, and a maximum number of edge connections that can be made to any one set. This method is utilized to minimize the interconnection cost of connected nodes in different sets. It has been found to be useful not only for the design of near-optimal circuit layouts but also in the computer-aided design of VLSI circuits, networks, databases, and the organization of distributed and parallel computations.

The result of the application of the graph-partitioning algorithm to the graph defined by the designer of the hypermedia document is a near-optimal organization of the document insofar as the optimality criteria specified by the designer reflect the desired use of the document.

In summary, apparatus is provided for determining the structure of a hypermedia document containing text and graphics that are to be laid out on several linked pages. This apparatus includes a system that specifies the assignment of text and graphics to pages and the links between the pages via a reduction to graph partitioning and the use of optimization techniques for graph partitioning. In one embodiment, display items and relations between these display items are listed along with a measure of their importance. These factors are captured in terms of numeric weights for edges between nodes in the associated graph to permit the system to assign display items to pages, and determine which pages should be linked, so that a user can move between pages in the most efficient manner. In a further embodiment, to accommodate limited display area that restricts the number of display items and page links that can be displayed simultaneously, the system can take into account multistage page moves that allow the user to access display items on different pages in sequence by moving from one page to another via links on other pages, through the use of "stepping-stone" nodes in the associated graph that record possible traversal routes in the document that are not represented in other formulations of the hypermedia-document-layout task.

BRIEF DESCRIPTION OF THE DRAWINGS

These and other features of the Subject Invention will be better understood taken in conjunction with the Detailed Description in conjunction with the Drawing of which.

DETAILED DESCRIPTION

Figure 1:
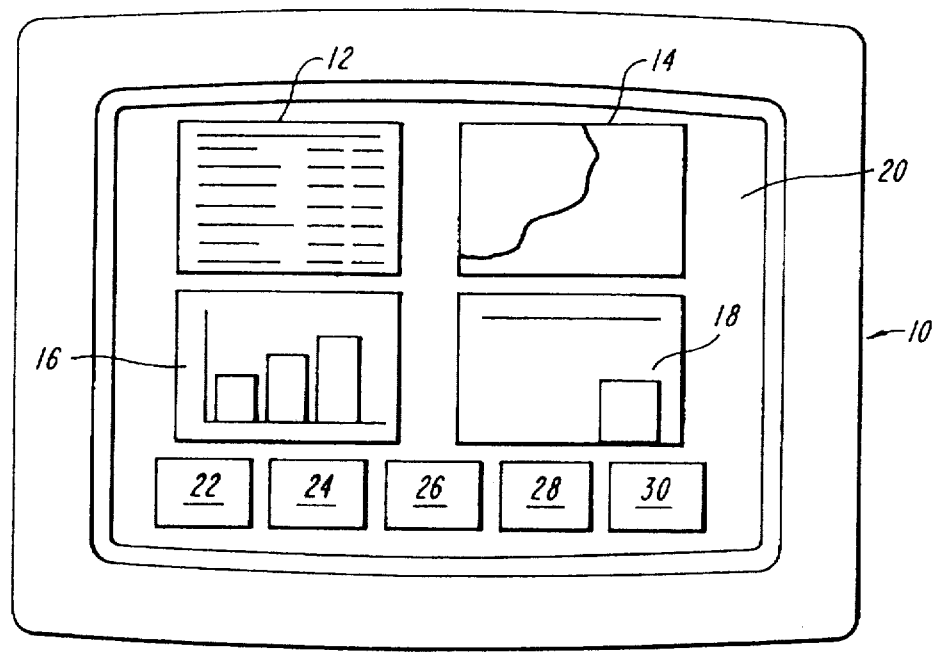
FIG. 1 is a diagrammatic representation of a computer screen in which a page of a hypermedia document is displayed, with the page including a number of display items arranged thereon, and with buttons each of which invokes a different navigational link.

Referring to FIG. 1, a computer screen 10 for use in many user interfaces, such as aircraft cockpits, power- and industrial-plant control consoles, information kiosks, automated teller machines, and videocassette recorders illustrates the placing of display items 12, 14, 16, and 18, on a page 20 that also includes navigational-link buttons 22, 24, 26, 28, and 30. It will be appreciated that this screen contains but one page amongst many presenting information to the user. The information is contained in a hypermedia document which includes pages of information and a linking structure that connects the pages. Navigating through the pages is accomplished by navigation buttons 22–30, in one embodiment, through the use of touch-screen technology.

The ability to provide a suitable structure for the hypermedia document to permit ease of navigation and access heretofore was a matter of manual design, not automatically optimized based on principles of graph partitioning.

Figure 2:
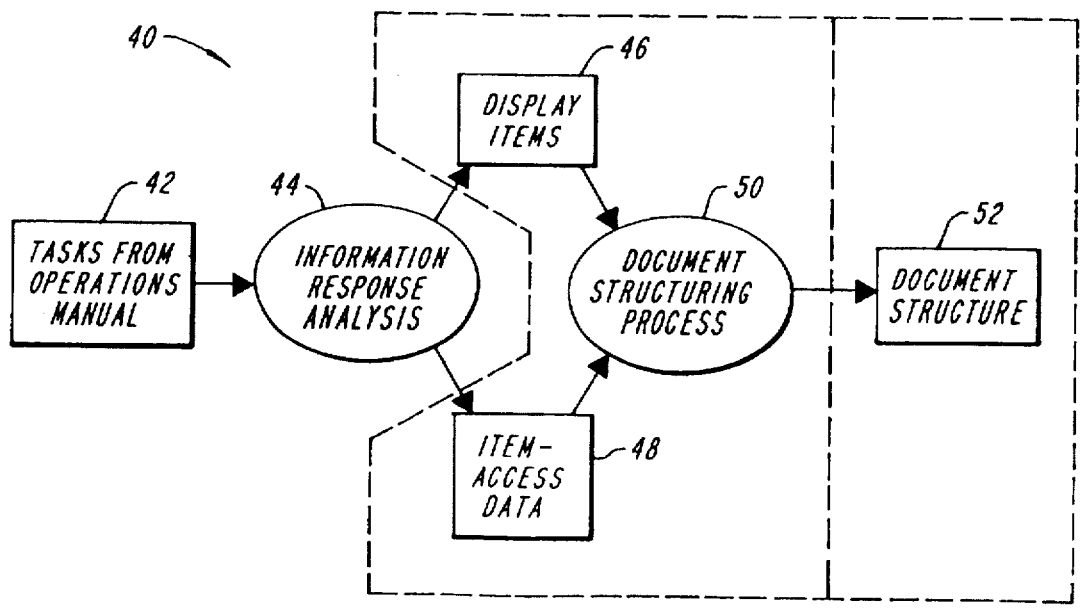
FIG. 2 is a block diagram of the Subject System in which tasks from an operations manual are analyzed as to information/response requirements, the analysis resulting in both a list of display items and a body of item-access data that describes the relevant relations between the display items, utilized by the Subject System for document structuring, with the list of display items and the item-access data being input to a computer via a text or graphical interface.

Referring now to FIG. 2, a system 40 for automatically optimizing the structure of a hypermedia document includes initially extracting tasks from an operations manual or similar source 42. Once the tasks have been extracted, a manual information/response analysis is performed at 44 to identify display items 46 and item-access data 48. Item-access data 48 specifies the nature of the relationship between display items 46, namely sequencing, direct and immediate accessibility, or conceptual clustering relationships for which numerical quantities indicate relative importance, frequency, and criticality.

Having derived the list of display items and the item-access data, graph partitioning is performed at 50 to assign the display items to pages and to specify the linkage structure between the pages. The result is a document structure 52 which is near-optimal with respect to displaying the information relevant for the tasks identified in the operations manual or other source. The output of this system is coupled to a display driver (not shown) which presents pages of information on screen 10 of FIG. 1 in the manner specified by the document structure. As a result, the Subject System constitutes a machine for the driving of a display screen with optimally presented pages of information.

Figure 3:
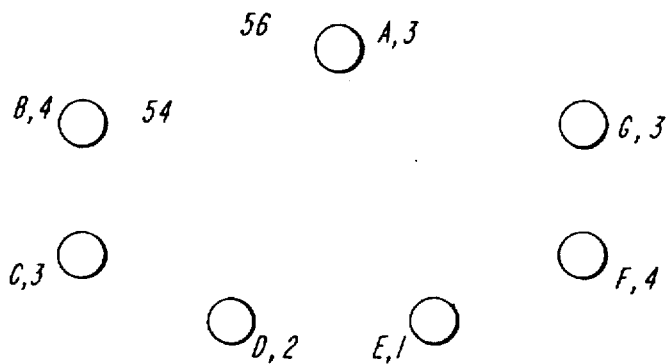
FIG. 3 is a diagrammatic representation of a sample set of graph nodes depicting display items with identifiers and areas specified for each display item.

Referring now to FIG. 3, the diagram illustrates the correspondence between display items and nodes in a graph, nodes which have associated with them an identifier and a size or area requirement. For instance, display item B, which has an area requirement of 4, is represented by a graph node 54. Likewise, node 56 represents display item A having an area requirement of 3. It will be appreciated that the remainder of the nodes represent other display items and their associated areas.

Figure 4:
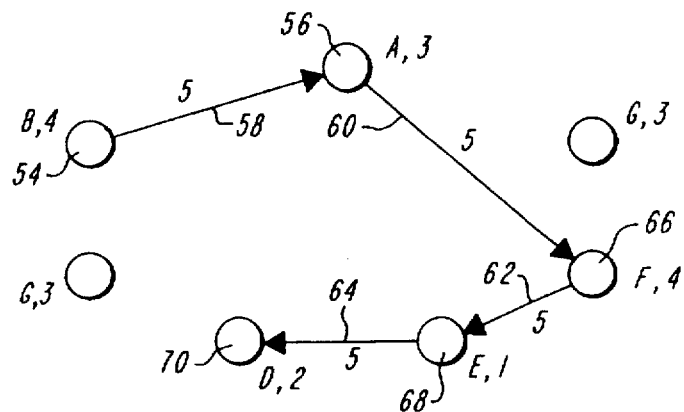
FIG. 4 is a diagrammatic representation of the weighted edges that are introduced in order to capture a relation between display items, in this case a sequencing relation.

Referring to FIG. 4, weighted edges 58, 60, 62, and 64 are introduced to connect nodes 54, 56, 66, 68, and 70 so as to represent an access sequence B, A, F, E, and D with frequency and criticality 5 and 1 respectively. It will be noted that the weight for each edge is the product of the criticality and frequency. In this manner, the cost due to a particular access sequence of having any connected pair of display items on different pages is recorded.

Figure 5:
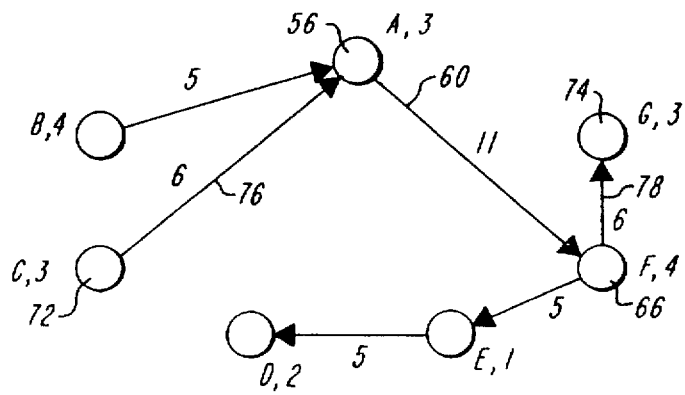
FIG. 5 is a diagrammatic representation of the graph of FIG. 4 indicating an additional set of weighted edges introduced in order to capture a different relation between display items, also including a former edge whose weight is augmented by the weight associated with this new sequencing relation.

Referring now to FIG. 5, a different access sequence, namely C, A, F, and G is specified by connecting nodes 72, 56, 66, and 74. It will be seen that a new edge is introduced between nodes 72 and 56 with weight 6 corresponding to a frequency and criticality of 3 and 2 respectively, as illustrated by edge 76. The edge 78 between nodes 66 and 74 is likewise introduced and give a weight of 6. The existing edge 60 connecting nodes 56 and 66 has its original weight of 5 augmented by 6 to yield a cumulative weight of 11. As can be seen, the weights originally established in information/response analysis 44 are combined into one number for the graph-partitioning process.

Figure 6:
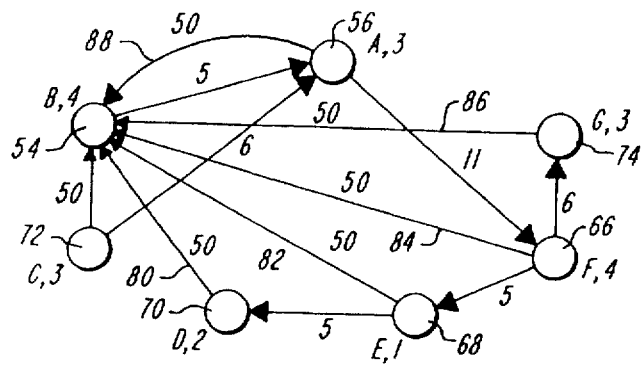
FIG. 6 is a diagrammatic representation of the weighted edges that are introduced in order to capture a relation between display items, in this case a relation indicating that a particular display item should be directly accessible from all other display items.

Referring now to FIG. 6, on occasion there will be a requirement that a given display item, here represented by node 54, must be directly accessible from any page in the document. This corresponds to a situation where immediate access to a particular display item is required in a specialized situation, for instance an aircraft emergency. This is represented by connecting nodes 72, 70, 68, 66, 74, and 56 to node 54 in the graph. As can be seen edges 80, 82, 84, 86, and 88 are all given a high combined criticality and frequency weight, arbitrarily 50 in this example.

Figure 7:
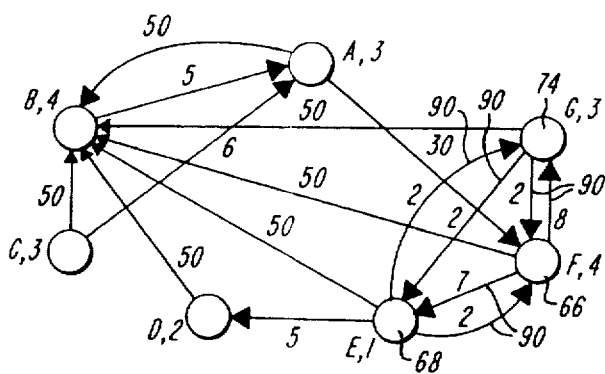
FIG. 7 is a diagrammatic representation of the weighted edges that are introduced in order to capture a relation between display items, in this case a relation that indicates a conceptual clustering of display items, which, if possible, are ideally assigned by the Subject System to one page.

Referring now to FIG. 7, oftentimes it is desirable to require that conceptually related display items appear on a single page, or a small number of pages. As can be seen, nodes 66, 68, and 74 represent such a cluster of display items E, F, and G. This cluster is given a weight of 2. As can be seen any new edges introduced in this step are given weight 2, and any existing edges have their respective weights incremented by 2. As can be seen by the edges 90 connection amongst the clustered nodes is bi-directional making the cluster fully connected. The result is that if a partition seeks to separate the nodes that have been so clustered, there will be a penalty related to each pair of nodes in the cluster that are assigned to separate pages.

Figure 8:
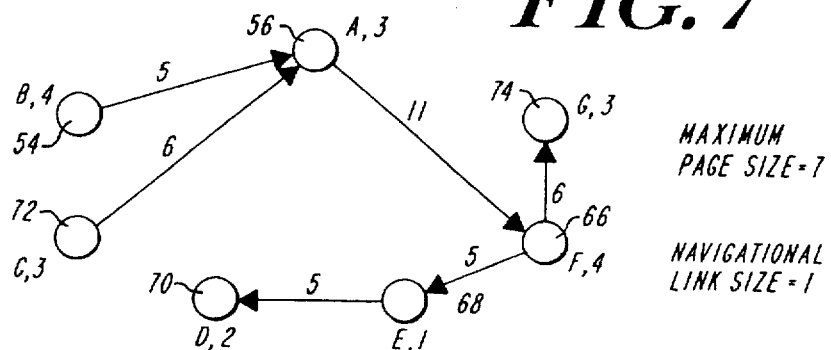
FIG. 8 is the graph of FIG. 4 indicating in addition the required maximum page size and the area taken up by the standard navigational-link button.

Referring to FIG. 8, and returning to the simpler example of FIG. 5, this example problem is considered with the following constraints: a maximum page size of 7 and a uniform navigational-link size of 1. This means that the sum of the areas associated with all nodes assigned to a page, plus the area required for all navigational links from that page, must be less than or equal to 7.

Figure 9:
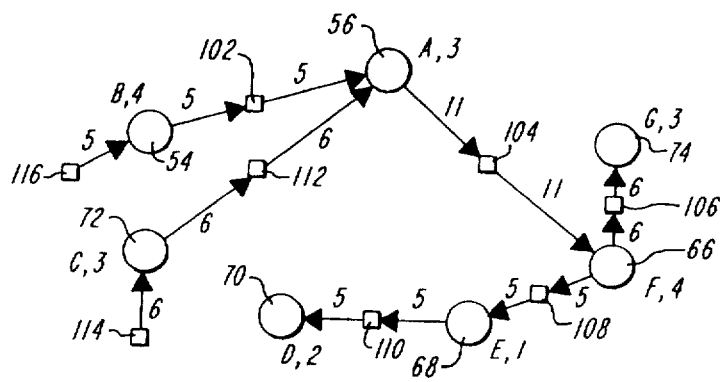
FIG. 9 is a diagrammatic representation of the introduction of stepping-stone nodes to each edge of the graph of FIG. 8.

Referring now to FIG. 9, partitioning the graph of FIG. 8 would result in a document structure in which all pages would be required to contain one or more display items. This would preclude document structures in which some pages contain only navigational links. Such document structures are not uncommon, and are sometimes optimal in the sense that these navigational links facilitate more efficient access to the data. For example, in a typical ATM system, the user must traverse a hierarchical menu, that is a sequence of menu pages containing only navigational-link buttons, before accessing pages that contain the desired information, such as bank balances.

As can be seen in FIG. 9, a number of additional nodes, 102, 104, 106, 108, 110, and 112 are interposed on all existing edges in the graph. Moreover, nodes 116 and 114 are introduced along with edges that connect them to nodes 54 and 72, which are distinguished by corresponding to the first display item in an access sequence or to a display item that is specified as having to be accessible from everywhere in the document.

As can be seen, edges to and from a stepping-stone node have weights identical to the edges into which the stepping-stone node is interposed. In effect, the interposition of a stepping-stone node divides the original edges into two edges. This provides flexibility in assigning nodes to pages in the subsequent partitioning process. The additional nodes introduced above are designated stepping-stone nodes because of their ability to serve as way stations in the process of moving from one display item to another in the document.

Figure 10:
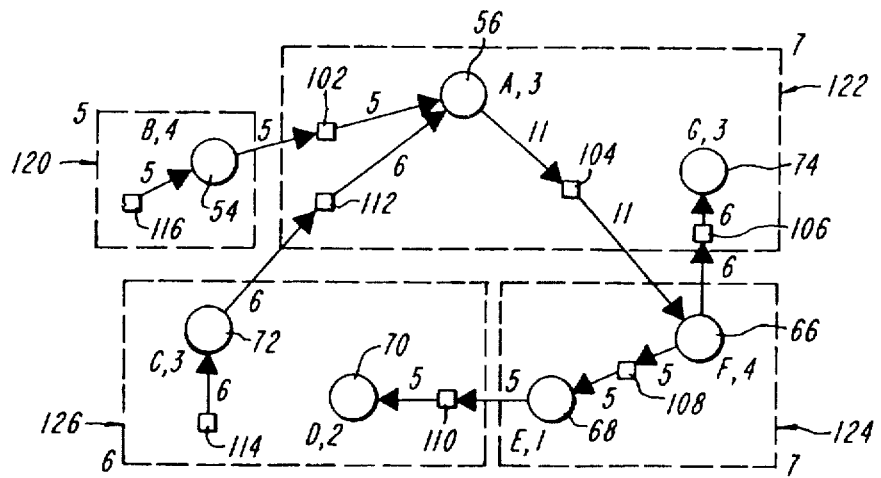
FIG. 10 is a diagrammatic representation of a manually derived assignment of display-item and stepping-stone nodes to pages such that the page size is not exceeded, resulting in a cut-set cost for the partition of 33.

Referring now to FIG. 10, in the graph-partitioning process nodes are assigned to pages as illustrated. Thus node 54 and 116 are assigned to page 120, whereas nodes 56, 74, 102, 112, 104, and 106 are assigned to page 122. Likewise, nodes 66, 68, and 108 are assigned to page 124, whereas nodes 70, 72, 110, and 114 are assigned to page 126. It will be noted that to the side of each page is a number reflecting the combined area of all display-item nodes and navigational links that go off-page. As can be seen, all pages have a number less than or equal to 7, which is the maximum allowed page size, noting that the uniform size for navigational-link nodes is 1.

This partitioning process is accomplished manually for the depicted graph. In the partitioning process, the degree of optimality achieved is reflected in the size of the cut set, which is the sum of the weights of edges that span from one page to another. In the depicted partition, the cut-set cost is 33, which is the sum of the weights 5, 6, 11, 6, and 5 on the edges between the pages.

Figure 11:
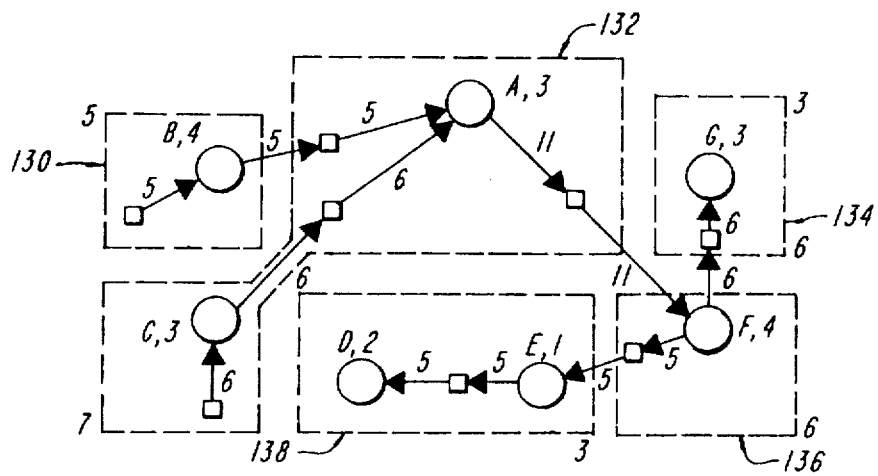
FIG. 11 is a diagrammatic representation of a computer-generated assignment of display-item and stepping-stone nodes to pages such that the page size is not exceeded and such that the cut-set cost is lower than that of FIG. 10 indicating a better solution; and, FIG. 12 is a diagrammatic representation of an alternative assignment of display-item and stepping-stone nodes to pages illustrating the existence of a page without display-item nodes, but with stepping-stone nodes.

In the Subject System, and as can be seen from FIG. 11, the nodes are assigned differently through the utilization of any one of a number of graph-partitioning techniques, the most common of which is the aforementioned Kernighan-Lin process. Here, the nodes are allocated to pages 130, 132, 134, 136, and 138. The cut-set cost for this partition is 27, indicating a better partition for the same graph illustrated in FIG. 10. It is noted that the number of pages has increased by 1, nonetheless resulting in a superior structure for the access of the information involved. What this partition accomplishes is a better arrangement of information on five pages than is accomplished manually in four pages.

Figure 12:
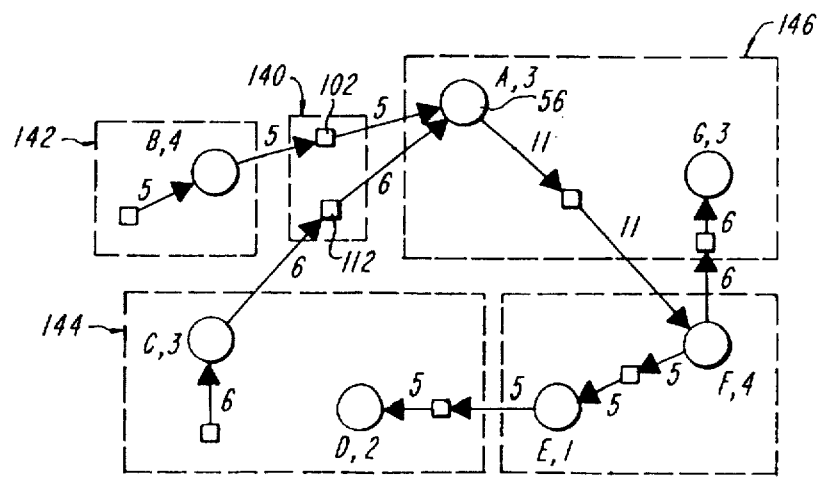

Referring now to FIG. 12, a partitioning is illustrated in which a particular page, namely page 140, contains no display-item nodes, but has been assigned two stepping-stone nodes 102 and 112. This page will therefore contain a navigational-link button to permit traversal via this page from pages 142 and 144 to page 146. It will be appreciated that since the edges emanating from the two stepping-stone nodes 102 and 112 point to the same display item 56 on page 146, only one navigational-link button is required on page 140, thus resulting in a total allocated area of 1 for page 140. This is an example of how one can collapse multiple edges to a single display-item node or a collection of display-item nodes on one page that can be referred to collectively. In this case the cut-set cost for the partition shown is 44, which is inferior to the partitions of FIGS. 10 and 11. However, it will be appreciated that for other graphs optimal or near-optimal partitions will require pages with no display-item nodes.

A program listing in C for the document-structuring system described above is appended hereto.

Having above indicated several embodiments of the Subject Invention, it will occur to those skilled in the art that modifications and alternatives can be practiced within the spirit of the invention, It is accordingly intended to define the scope of the invention only as indicated in the following claims.

APPENDIX

```
Makefile         Tue Nov 29 19:49:01 1994         1
# Substitute names of your files for the content
of PROGRAM, SOURCES and OBJECTS CC     = gcc
CFLAGS = -c -g -Wall PROG    = kl              # name of your program
SOURCES= io.c kl.c        # list of the C source files
OBJECTS= io.o kl.o        # !HAS! to be the same as SOURCES but
                          # with suffix '.c' replaced by '.o'

$(PROG):    $(OBJECTS)
            $(CC) -g -o $@ $(OBJECTS)

$(OBJECTS):
            $(CC) $(CFLAGS) $(SOURCES)

#------------- utils --------------#
print:
            lpr -Pcork $(SOURCES)

clean:
            rm $(PROG) $(OBJECTS)
```

```
gp.h          Tue Nov 29 19:48:35 1994                    2

* RH: added for the I/O component
 */ typedef struct _info {
    int    id;
    float  a_info;
}info;

/*
 * Extern declarations.
 */

/* global vars */
FILE  *fpscr;          /* file pointer to input */
FILE  *fpout;          /* file pointer to output */
info  *rg_info;        /* stores info src       */
int    num_info;       /* number of info src    */
int    num_nodes;      /* number of info src + intermediary nodes */ int    interval;       /* total number of intermediary nodes for each info src */
int    num_parts;      /* number of partitions */
int    num_between;    /* number of intermediary nodes */
float  a_page;         /* max area of a page */
float  link_size;      /* size of a link */
bool  *rg_connect;     /* shows whether the node has any
                          connection to other nodes */
int   *p0, *p1;        /* buffers used to separate the nodes from the
                          currently switching pages */

/* for io */
int  iFindInfo(int id, int range);
void ReadInput(graph *pcost_graph);
void PrintMatrix(graph cost_graph);
void init_graph(graph *pcost_graph);
float ConWt(graph g, int src, int dst);

/* for kl */
bool valid_part(part_area pa);
void print_partitions(partition p, part_area pa, page_mapping pm);
void global_init(graph *pg, partition *pp, edge_count *pec);
void add_to_ec(partition p, edge_count ec, int gsrc, int gdst, float wt);
void update_ec_step(graph g, edge_count ec,
                    int p_src, int p_dst, int isrc, int gsrc);
void update_ec(graph g, edge_count ec, int p_src, int p_dst, int isrc);
void init_ec_info(graph g, partition p, edge_count ec);
void add_to_pm(graph g, partition p, int gsrc, int gdst, page_mapping pm);
void update_pm_step (graph g, partition p, int p_src, int p_dst,
                     int isrc,part_area pa, page_mapping pm, int iignore);
void update_pm (graph g, partition p, int p_src, int p_dst,
                int isrc,part_area pa, page_mapping pm, int iignore);
void init_part_info(partition p, graph g, part_area pa, page_mapping pm);
bool improve_part (partition p, graph g, part_area pa, page_mapping pm);
bool random_partition(graph g,partition p,edge_count ec,
                      part_area pa,page_mapping pm);
void swap_in_links (int p_src, int p_dst, int p_other,
                    part_area pa, page_mapping pm);
void swap_out_links (int p_src, int p_dst, int p_other,
                     part_area pa, page_mapping pm);
void swap_links (int p_src, int p_dst, part_area pa, page_mapping pm);
void swap_area (graph g, partition p, part_area pa,
                page_mapping pm, int ind_0, int ind_1);
bool area_exceed(graph g, partition p, part_area pa,
                 page_mapping pm, int ind_0, int ind_1, float *pwt);

void swapping (graph g,partition p,edge_count ec,part_area pa,
               page_mapping pm, int ind_0, int ind_1, bool fArea);
float edge_gain(graph g, partition p, edge_count ec, part_area pa,
                page_mapping pm, int ind_0, int ind_1, float best);
float area_gain(graph g, partition p, edge_count ec, part_area pa,
                page_mapping pm, int ind_0, int ind_1, float dummy);
bool next_swap(graph g, partition p, edge_count ec,
               swap_record swapped_already,part_area pa,
               page_mapping pm, best_swap *pbest, int par_0,
               int par_1, bool fArea);
bool kl(graph g,partition p,edge_count ec,
        part_area pa,int par_0,int par_1, page_mapping pm,bool fArea);
```

```
io.c       Tue Nov 29 19:47:03 1994        1 include <stdio.h>
include <stdlib.h>
#include <assert.h>
#include "gp.h"

#ifndef SEEK_SET
#define SEEK_SET 0
#endif

/****************************
   Function that takes the name of the
   information source and returns the
   index to its entry.

currently, simple linear search
****************************/
int iFindInfo(int id, int range) {
   int i;

for (i=0;i<range;i++) {
      if (rg_info[i].id == id)
         break;
   } if (i<range)
      return i;

printf ("ERROR: no such info src: %d\n", id);
   return ERROR;
}

/* skips over the commented lines and blank lines */
bool SkipComment(FILE *fp, char *buff)
{
   char ch;

do{
      if ((fgets(buff, MAX_LEN, fp) == NULL) ||
          (!strcmp (buff, "DONE\n")))
         return FALSE;

sscanf(buff, "%c", &ch);
   }
   while ((ch == '#')|| (!strcmp(buff, "\n")));
   return TRUE;
} void gl_insert(glist *pgl, int gid, float wt)
{
   /* if gid is already in gl, then inc wt, else create new node */
   g_node *pgn;

pgn = pgl->list;
   gl_search(pgn,gid);

if (pgn)
      /* found gid in the list */
      pgn->weight += wt;
   else {
      /* else create new item */
      assert (pgn = (g_node *)malloc(sizeof(g_node)));
      pgn->gid = gid;
      pgn->weight = wt;
```

```
      pgn->next = pgl->list;
      pgl->list = pgn;
      pgl->count++;
   }
} void Connect(graph g, int ifrom, int ito, float weight)
{
   int g_from, g_to, i, mids;

g_from = i2g(ifrom);
   g_to   = i2g(ito);

assert (g_from != g_to);   /* nodes don't self loop */
   gl_insert (&g[g_from], g_to, weight);

mids = ifrom + (ito/(interval+1))*num_between + 1;

for (i=1; i<num_between; i++) {
      rg_connect[mids++] = TRUE;
   }
   rg_connect[mids] = TRUE;
   rg_connect[ito] = TRUE;
} void ReadRegScript(graph g)
{
   int ito, ifrom, id;
   float freq, crit;
   char buff[MAX_LEN], ch;
   long offset;   /* pointer to save prev line */ for (;;) {
      offset = ftell(fpscr);
      if (!SkipComment(fpscr, buff))
         return;

sscanf(buff, "%c", &ch);

if ((ch == 'c')||(ch == 'e')) {
         /* going to the next section */
         fseek(fpscr, offset, SEEK_SET);
         return;
      } if (ch == 'r') {
         sscanf (buff, "%c%f%f", &ch, &freq, &crit);
         ifrom = START;
         continue;
      } sscanf (buff, "%d", &id);
      ito = iFindInfo(id, num_nodes);

if (ifrom != START)
         Connect(g, ifrom, ito, (int)(freq*crit));

ifrom = ito;
   }
} void ReadEmgScript(graph g)
{
```

```
io.c      Tue Nov 29 19:47:03 1994           2 int i,j, ifrom, ito, id;
  float freq, crit;
  char buff[MAX_LEN], ch;
  long offset;  /* pointer to save prev line */

/* structure to store the head node of every emergency script */
  struct _ehead {
    float wt;
    int ind;
  }rg_e_head[MAX_E_SCRIPT];
  int e_count = 0;

for (;;) {
    offset = ftell(fpscr);
    if (!SkipComment(fpscr, buff))
      break;

sscanf(buff, "%c", &ch);

if (ch == 'c') {
      /* going to the next section */
      fseek(fpscr, offset, SEEK_SET);
      break;
    } if (ch == 'e') {
      sscanf(buff, "%c%f%f", &ch, &freq, &crit);
      ifrom = START;
      assert (e_count < MAX_E_SCRIPT);
      rg_e_head[e_count].wt = (freq * crit);
      continue;
    } sscanf (buff, "%d", &id);
    ito = iFindInfo(id, num_nodes);

if (ifrom != START)
      Connect(g, ifrom, ito, rg_e_head[e_count-1].wt);
    else rg_e_head[e_count++].ind = ito;

ifrom = ito;
  }

/* do we want to normalize the connections here??? */
  /* every head of an emergency script should be connected
     to all nodes in other scripts */
  for (i=0; i<e_count; i++) {
    for (j=0; j<num_nodes; j+=(interval+1))
      if (j!=rg_e_head[i].ind)
        Connect(g, j, rg_e_head[i].ind, rg_e_head[i].wt/(num_info-1));
  }
}
void Connect_C(graph g, int top, int *rg_n, float wt)
{
  int i, j;

for (i=0; i<top; i++)
    for (j=i+1; j<top; j++) {
      Connect(g, rg_n[i], rg_n[j], wt);
      Connect(g, rg_n[j], rg_n[i], wt);
    }
}
void ReadCluster(graph g)
{
  int id, c_top;
  float weight;
  char buff[MAX_LEN], ch;
  int cnodes[MAX_N];

for (c_top=0;;) {
    if (!SkipComment(fpscr, buff))
      break;  /* do one last batch of connects */ sscanf(buff, "%c", &ch);

if (ch == 'c') {
      if (c_top)
        Connect_C(g, c_top, cnodes, weight);
      c_top = 0;
      sscanf (buff, "%c%f", &ch, &weight);
      continue;
    } sscanf (buff, "%d", &id);
    cnodes[c_top++] = iFindInfo(id, num_nodes);
  }
  Connect_C(g, c_top, cnodes, weight);
}

/***************************
  Reads in the script input and
  sets up the necessary data structure
  to get the algorithm started.
***************************/
void ReadInput(graph *pcost_graph)
{
  char buff[MAX_LEN];
  int i, j;

/* number of partitions */
  assert (SkipComment(fpscr, buff));
  sscanf (buff, "%d", &num_parts);
  assert (num_parts <= MAX_PARTS);

/* number of intermediary nodes */
  assert (SkipComment(fpscr, buff));
  sscanf (buff, "%d", &num_between);
  assert (num_between <= MAX_BETWEEN);

/* maximum page size ? */
  assert (SkipComment(fpscr, buff));
  sscanf (buff, "%f", &a_page);

assert (SkipComment(fpscr, buff));
  sscanf (buff, "%f", &link_size);

/* how many info arcs ? */
  assert (SkipComment(fpscr, buff));
  sscanf (buff, "%d", &num_info);
  assert (num_info <= MAX_N);

interval = num_between*num_info;
  num_nodes = (1 + interval)*num_info;

/* allocate spaces for storage */
  rg_info = (info *)calloc (num_nodes,sizeof(info));
  assert(rg_info);
```

```
io.c          Tue Nov 29 19:47:03 1994        3 rg_connect = (bool *)calloc (num_nodes,sizeof(bool));
    assert(rg_connect);

(*pcost_graph) = (graph)calloc (num_info,sizeof(glist));
    assert (*pcost_graph);

/* info arc entries */
    for (i=0; i<num_nodes; i++) {
      assert (SkipComment(fpscr, buff));
      sscanf (buff, "%d%f", &rg_info[i].id, &rg_info[i].a_info);
      for (j=0; j<interval; j++) {
        rg_info[++i].id = BETWEEN;
        rg_info[i].a_info = 0.;
      }
    }

/* doing the script entries */
    ReadRegScript(*pcost_graph);
    ReadEmgScript(*pcost_graph);
    ReadCluster(*pcost_graph);
} void PrintMatrix(graph cost_graph) {
    int gi;
    g_node *pgn;

for (gi=0; gi<num_info; gi++)
    {
        fprintf (fpout, "node %d has %d out links:\n",
                 rg_info[g2i(gi)].id, cost_graph[gi].count);
        fprintf (fpout, "\t");
        for (pgn = cost_graph[gi].list; pgn; pgn=pgn->next)
            fprintf (fpout,"(%d %5.2f) ", rg_info[g2i(pgn->gid)].id, pgn->weight);
        fprintf (fpout, "\n");
    }
    fprintf (fpout, "\n");
} void init_graph(graph *pg)
{
    fpscr = fopen("script", "r");
    assert (fpscr);
    ReadInput(pg);
    PrintMatrix(*pg);
} float ConWt(graph g, int isrc, int idst)
{
    bool fValid = FALSE;  /* assume not */
    int gsrc, gdst;
    g_node *pgn;

gsrc = i2g(isrc);
    gdst = i2g(idst);

/* no links to self */
    if (isrc == idst)
        return FALSE;

/* if there's no stepping node, it's just the old way */
    if (!num_between) {
        assert ((gsrc == isrc) && (gdst == idst));
        pgn = g[gsrc].list;
        gl_search(pgn,gdst);
```

```
    if (pgn)
        return pgn->weight;
    else
        return FALSE;
} if (gsrc == gdst) {
    /* dealing with two nodes coming from
       the same info node */

/* find out where we're going (i.e. what path is dst on*/
    gdst = (idst - g2i(gsrc))/num_between - 1;

if (is_i_info(isrc)) {
        /* isrc is an info node so we want to make sure that dst
         * is a level 1 stepping node */
        assert (idst > isrc);

if (idst == off2i(isrc,gdst))
            fValid = TRUE;
    }
    else {  /* src is a stepping node */
        if ((idst == isrc+1) &&
            ((idst/num_between) == (isrc/num_between)))
            fValid = TRUE;
    }
}
else /* the nodes are from two different info nodes */
    if (is_i_info(idst))
        /* if dst is an info node, src must be one of the final
         * level stepping node
         */ if (isrc == (off2i(g2i(gsrc),gdst) + num_between -1))
            fValid = TRUE;

if (fValid) {
    pgn = g[gsrc].list;
    gl_search(pgn,gdst);

if (pgn)
        return pgn->weight;
    else
        assert (printf ("ERROR: can't find node!\n") && FALSE);
}
return FALSE;
}
```

```
k1.c       Tue Nov 29 19:46:44 1994        1

/*
 * Kernighan-Lin heuristic for graph partitioning.
 * Owner: Joe Marks
 * History: Created, 6/15/94
 *          Last revised, 7/6/94
 *          Modified by Rebecca Hwa for cockpit layout problem
 *          Newly Revised, 8/18/94
 */

/*
 * Include files.
 */ include <stdlib.h>
include <stdio.h>
#include <limits.h>
#include <assert.h>
#include <string.h>
#include <math.h>
#include "gp.h"

/*****************************************************
 * Functions.
 *****************************************************/
/* memory allocation & free functions */
edge_count alloc_ec()
{
    int i;
    edge_count ec;

ec = (edge_count)calloc (num_parts, sizeof(float *));
    assert(ec);
    for (i=0; i<num_parts; i++) {
        ec[i] = (float *)calloc(num_nodes, sizeof(float));
        assert(ec[i]);
    } return ec;
} void free_ec(edge_count ec)
{
    int i;

for (i=0; i<num_parts; i++)
    {
        assert(ec[i]);
        free(ec[i]);
    }
    assert(ec);
    free(ec);
} void free_part(partition p)
{
    assert(p);
    free(p);
} partition alloc_part()
{
    partition p;

p = (partition)calloc(num_nodes, sizeof(int));
    assert (p);
    return p;
}

/*
 * Global init.
 */
void global_init(graph *pg, partition *pp, edge_count *pec)
{
    srand48(RAND_SEED);
    init_graph(pg);

assert (*pec = alloc_ec());
    assert (*pp = alloc_part());
    assert (p0 = (int *)malloc(num_nodes*sizeof(int)));
    assert (p1 = (int *)malloc(num_nodes*sizeof(int)));
} void add_to_ec(partition p, edge_count ec, int gsrc, int gdst, float wt)
{
    int i, isteps;
    int isrc = g2i(gsrc);
    int idst = g2i(gdst);

if (!num_between) {
        assert ((isrc == gsrc) && (idst == gdst));
        ec[p[gsrc]][gdst] += wt;   /* idst == gdst */
        ec[p[gdst]][gsrc] += wt;   /* isrc == gsrc */
        return;
    } isteps = off2is(isrc,gdst);

ec[p[isrc]][isteps] += wt;
    ec[p[isteps]][isrc] += wt;

for (i=1; i<num_between; i++) {
        ec[p[isteps]][++isteps] += wt;
        ec[p[isteps]][isteps-1] += wt;
    }
    /* make sure that we're at where we think we are */
    assert (isteps == (off2is(isrc,gdst)+num_between -1));

ec[p[isteps]][idst] += wt;
    ec[p[idst]][isteps] += wt;
}
void update_ec_step(graph g, edge_count ec,
                    int p_src, int p_dst, int isrc, int gsrc)
{
    float wt;
    int gdst = is2gd(isrc,g2i(gsrc));

/* there are at most one incoming and one
       outgoing link for a stepping node */

/* if there is no link, return */
    if ((wt = path_wt(g, gsrc, gdst)) == 0)
        return;

/* first, the out link */
    /* We check to see if this is a final level stepping node */
```

```
kl.c        Tue Nov 29 19:46:44 1994        2 if (isrc == (off2is(g2i(gsrc),gdst)+(num_between-1))) {
        /* decrease from p_src and add to p_dst */
        ec[p_src][g2i(gdst)] -= wt;
        ec[p_dst][g2i(gdst)] += wt;
    }
    else {
        /* the out going link must connect to the next stepping node */
        ec[p_src][isrc+1] -= wt;
        ec[p_dst][isrc+1] += wt;
    }

/* now we do the incoming link */
    /* We check to see if this is a first level stepping node */
    if (isrc == (off2is(g2i(gsrc),gdst))) {
        /* decrease from p_src and add to p_dst */
        ec[p_src][g2i(gsrc)] -= wt;
        ec[p_dst][g2i(gsrc)] += wt;
    }
    else {
        /* the incoming link must connect to the previous stepping node */
        ec[p_src][isrc-1] -= wt;
        ec[p_dst][isrc-1] += wt;
    }
}

/* update_ec:
 *   deduct ec[p_src][<any node connected w/ isrc>]
 *   add to ec[p_dst][<...>]
 */
void update_ec(graph g, edge_count ec, int p_src, int p_dst, int isrc)
{
    int istep, gi;
    float wt;
    int gsrc = i2g(isrc);
    int gdst;
    g_node *pgn;

if ((is_i_info(isrc)) {
        /* isrc is a step node, handle as a special case */
        update_ec_step (g, ec, p_src, p_dst, isrc, gsrc);
        return;
    }

/* first do all the out-going nodes:
       if there are stepping nodes, then we want to
       connect to first level stepping nodes */
    for (pgn=g[gsrc].list; pgn; pgn = pgn->next)
    {
        gdst = pgn->gid;
        if (num_between)
            istep = off2is(isrc,gdst);
        else istep = gdst;  /* gdst == g2i(gdst) */
        wt = ConWt(g, isrc, istep);

/* decrease from p_src and add to p_dst */
        ec[p_src][istep] -= wt;
        ec[p_dst][istep] += wt;
    }

/* now we have to loop through all the possibly incoming nodes,
       i.e.: all possible info nodes */
    for (gi=0; gi<num_info; gi++) {
        pgn=g[gi].list;
        gl_search(pgn,gsrc);
```

```
    if (pgn) {
        assert (pgn->gid == gsrc);

/* if we have stepping nodes:
             from last stepping node of gnode_i to gsrc
           otherwise: from gi to gsrc */
        if (num_between)
            istep = off2is(g2i(gi),gsrc) + (num_between - 1);
        else istep = gi;  /* g2i(gi) == gi */ if ((wt = ConWt (g,istep,isrc)) == 0)
            continue;

ec[p_src][istep] -= wt;
        ec[p_dst][istep] += wt;
        }
    }
} void init_ec_info(graph g, partition p, edge_count ec)
{
    g_node *pgn;
    int i;

for (i=0; i<num_info; i++)
        for (pgn = g[i].list; pgn; pgn = pgn->next)
            add_to_ec(p, ec, i, pgn->gid, pgn->weight);
} void add_to_pm(graph g, partition p, int gsrc, int gdst, page_mapping pm)
{
    int i, isrc, idst, isteps;
    isrc = g2i(gsrc);
    idst = g2i(gdst);

if (!num_between) {
        assert ((isrc == gsrc) && (idst == gdst));
        pm[p[gsrc]][p[gdst]]++;
        return;
    } isteps = off2is(isrc,gdst);
    pm[p[isrc]][p[isteps]]++;

/* there are num_between-1 links to update in the stepping node block*/
    for (i=1; i<num_between; i++)
        pm[p[isteps]][p[++isteps]]++;

pm[p[isteps]][p[idst]]++;
}

/***
 * init_part_info stores information about the partitions into
 * the relevant structures:
 *   :pm shows what pages point to each other
 *     e.g. pm[i][j] means that there's an arc from page i to page j
 *   :pa keeps count of how much area is taken up in each partition
 *     NOTE: the initial set up may results in overstuffed area for
 *     some partition, but it will be corrected as we go along
 ***/
void init_part_info(partition p, graph g, part_area pa, page_mapping pm)
{
    int i, j, interval;
``` kl.c        Tue Nov 29 19:46:44 1994        3

```
    g_node *pgn;

for (i=0; i<num_parts; i++) {
        pa[i]=0.;
        for (j=0; j<num_parts; j++)
            pm[i][j] = 0;
    }
    /* first do all the info sources areas */
    for (i=0, interval = num_info*num_between+1; i<num_nodes; i+= interval)
        pa[p[i]] += rg_info[i].a_info;

/* figure out what pages are pointing to each other
       We can't use ec because ec contains "from" links as well as "to" links.
       (Also, the ec counts are weighted.)
       Here, we're only interested in the "to" links.  So we need to look up
       the original graph.       */ for (i=0; i<num_info; i++)
        for (pgn=g[i].list; pgn; pgn = pgn->next) {
            assert (pgn->gid != i);     /* no node points to itself */
            add_to_pm(g, p, i, pgn->gid, pm);
        } for (i=0; i<num_parts; i++)
        for (j=0; j<num_parts; j++)
            /* no link cost if a page points to itself */
            if ((pm[i][j]) && (i != j))
                pa[i]+=link_size;
} bool improve_part (partition p, graph g, part_area pa, page_mapping pm)
{
    int pass, i, j, count;
    edge_count dummy;  /* just there to fill up parameter when calling kl */ pass = 0;
    do {
        fprintf (fpout,"Pass #%d\n", ++pass);
        fprintf (fpout,
"*********************************************************\n");
        for (i=0, count=0; i<num_parts; i++)
            for (j=i+1; j<num_parts; j++) {
                /* we'll not print out all the swap moves so that the final file
                   wont' be too long. */
                if (kl (g, p, dummy, pa, i, j, pm, TRUE))
                    count++;
            }
        if (valid_part(pa)) {
            print_partitions(p, pa, pm);
            fprintf (fpout,"\n");
            return TRUE;
        }
    }while(count>0);
    print_partitions(p, pa, pm);

fprintf (fpout,"Can't come up with an initial partitioning.\n");
    return FALSE;
}
/***
 * valid_part is a function that checks if the partition assignment
 * violates the area constraint.  It returns TRUE if the elements of
 * the parition fits, and FALSE otherwise
 ***/
bool valid_part(part_area pa)
{
    int i;

for (i=0; i<num_parts; i++)
        if ((pa[i] - a_page) > 0)
            break;

if (i != num_parts)
        return FALSE;
    return TRUE;
}

/*
 * Create a random partition.  This is primarily for use with
 * Kernighan-Lin and other heuristics that start with a random
 * partition.  A partition is created by assigning nodes consecutively
 * to each partition, and then randomly swapping pairs of nodes
 * between the partitions.
 *
 * NOTE: for the cockpit layout purpose, we must factor in the area
 * constraint -- we must insure that the initial partition does not
 * violate the area constraint.
 */
bool random_partition(graph g, partition p, edge_count ec,
                      part_area pa, page_mapping pm)
{
    extern double drand48();
    int i, x, y, tmp_i ;

for (i = 0 ; i < num_nodes ; i++)
        p[i] = i % num_parts;

for (i = 0 ; i < (5 * num_nodes) ; i++)
    {
        x = rand_int(0, num_nodes-1) ;
        y = rand_int(0, num_nodes-1) ;
        if (p[x] != p[y]) {
            tmp_i   = p[x];
            p[x] = p[y];
            p[y] = tmp_i;
        }
    } init_part_info(p, g, pa, pm);

print_partitions(p, pa, pm);
    if (!valid_part(pa))        /* if original assignment is not valid */
        if (!improve_part(p, g, pa, pm))  /* and if we can't improve it any more */
            return FALSE;                 /* then we declare failure */ init_ec_info(g, p, ec);     /* otherwise, we init everything else */
    return TRUE;
}
/************
swap_links_in  deals with this situation:
    p_other         p_src           p_dst
   |       |       |       |       |       |
   |       |       |       |       |       |
   |       |       |       |       |       |
   | x ----+------>|  y    |       |   z   |
```

```
k1.c        Tue Nov 29 19:46:44 1994         4

|____|      |____|   |____|
where we're swapping node y and x, and node x points to y
(if it were a move op, then we're just moving node y into
page p_dst)
***************/
void swap_in_links (int p_src, int p_dst, int p_other,
                    part_area pa, page_mapping pm)
{
    assert (pm[p_other][p_src]);
    pm[p_other][p_src]--;
    pm[p_other][p_dst]++;

if ((!pm[p_other][p_src]) && (p_other != p_src))
        pa[p_other] -= link_size;

if ((pm[p_other][p_dst] == 1) && (p_other != p_dst))
        pa[p_other] += link_size;
}
/***********
   swap_links_out  deals with the arrows going in the other direction:
    p_src          p_other          p_dst
   |____|         |____|          |____|
   | y |--------->| x |          | z |
   |____|         |____|          |____| where we're still swapping node y and x, but here, y points to x.
(if it were a move op, then we're just moving node y into
page p_dst)
***************/
void swap_out_links (int p_src, int p_dst, int p_other,
                     part_area pa, page_mapping pm)
{
    assert (pm[p_src][p_other]);
    pm[p_src][p_other]--;
    pm[p_dst][p_other]++;

if ((!pm[p_src][p_other]) && (p_src != p_other))
        pa[p_src] -= link_size;

if ((pm[p_dst][p_other] == 1) && (p_dst != p_other))
        pa[p_dst] += link_size;
}
/***********
   swap_links is for the case when we have
    p_src          p_dst
   |____|         |____|
   | x |--------->| y |
   |____|         |____| and we want to swap x and y
***************/
void swap_links (int p_src, int p_dst,
                 part_area pa, page_mapping pm)
{
```

```
    /* if nodes x and y are from the same partition, no need to update */
    if (p_src == p_dst)
        return;

assert (pm[p_src][p_dst]);
    pm[p_src][p_dst]--;
    pm[p_dst][p_src]++;

if (!pm[p_src][p_dst])
        pa[p_src] -= link_size;

if (pm[p_dst][p_src] == 1)
        pa[p_dst] += link_size;
} void update_pm_step (graph g, partition p,
                     int p_src, int p_dst, int isrc,
                     part_area pa, page_mapping pm, int iignore)
{
    int gsrc, gdst;

gsrc = i2g(isrc);
    gdst = is2gd(isrc,g2i(gsrc));

/* is our node on a connected path? if not, nothing to do */
    if (!Connt(g, g2i(gsrc), off2is(g2i(gsrc),gdst)))
        return;

/* first, the out link */
    /* We check to see if this is a final level stepping node. */
    if (isrc == (off2is(g2i(gsrc),gdst)+(num_between-1))) {
        if (g2i(gdst) != iignore)   /* cannot be an ignore node */
            swap_out_links(p_src, p_dst, p(g2i(gdst)),pa, pm);
    }
    else {
        /* the out going link must connect to the next stepping node */
        if ((isrc+1) != iignore)
            swap_out_links(p_src, p_dst, p[isrc+1], pa, pm);
    }

/* now we do the incoming link */
    /* We check to see if this is a first level stelpping node */
    if (isrc == (off2is(g2i(gsrc),gdst))) {
        if (g2i(gsrc) != iignore)
            swap_in_links(p_src, p_dst, p[g2i(gsrc)], pa, pm);
    }
    else {
        /* the incoming link must connect to the previous stepping node */
        if ((isrc-1) != iignore)
            swap_in_links(p_src, p_dst, p[isrc-1], pa, pm);
    }
} void update_pm (graph g, partition p, int p_src, int p_dst, int isrc,
                part_area pa, page_mapping pm, int iignore)
{
    int gi, istep, gsrc, gdst, li;
    g_node *pgn;

gsrc = i2g(isrc);
    if (!is_i_info(isrc)) {
        /* if the node of interest is a stepping node */
        update_pm_step (g, p, p_src, p_dst, isrc, pa, pm, iignore);
        return;
```

```
kl.c            Tue Nov 29 19:46:44 1994           5

}
/* first do all the out-going nodes:
    connecting to first level stepping nodes */
for (pgn=g[gsrc].list; pgn; pgn = pgn->next)
{
    /* gsrc has a path to gdst. We need update page information
        about the first stepping node */
    gdst = pgn->gid;
    if (num_between)
        istep = off2is(isrc,gdst);
    else istep = gdst;
    assert (istep > DUMMY);
    /* decrease from p_src and add to p_dst */
    if (istep != iignore)
        swap_out_links(p_src, p_dst, p[istep], pa, pm);
}

/* now we have to loop through all the possibly incoming nodes,
    i.e.: all possible info nodes
    and then we need to do the swap between the node and all the
    final leve stepping nodes that point into it*/
for (gi=0; gi<num_info; gi++) {
    pgn=g[gi].list;
    g}_search(pgn,gsrc);
    if (pgn) {
        /* there is a path from gi to gsrc */
        assert (pgn->gid == gsrc);

ii = g2i(gi);
        /* if we have stepping nodes:
            from last stepping node of gnode_i to gsrc */
        if (num_between)
            istep = off2is(ii,gsrc) + (num_between - 1);
        else istep = ii;
        if (istep != iignore)
            swap_in_links(p_src, p_dst, p[istep], pa, pm);
    }
}
} void swap_area (graph g, partition p, part_area pa,
                page_mapping pm, int ind_0, int ind_1)
{
    int p_dst;

/* check for move ops */
    if (ind_1 > DUMMY)
        p_dst = p[ind_1];
    else
        /* ind_1 == DUMMY - (page number of dst)
            (page number of dst == DUMMY - ind_1) */
        p_dst = DUMMY - ind_1;

if (ind_1 <= DUMMY) {
        /* first figure out the area change due to info-sources */
        pa[p[ind_0]] -= rg_info[ind_0].a_info;
        pa[p_dst]    += rg_info[ind_0].a_info;

/* we want to update page mapping information for
            all the nodes connected to ind_0
         */ update_pm(g, p, p[ind_0], p_dst, ind_0, pa, pm, DUMMY);
```

```
        return;
    }
    /* Otherwise, we do swapping */

/* first figure out the area change due to info-sources */
    pa[p[ind_0]] += (rg_info[ind_1].a_info - rg_info[ind_0].a_info);
    pa[p[ind_1]] += (rg_info[ind_0].a_info - rg_info[ind_1].a_info);

/* now update all the links other than the trading nodes*/
    update_pm(g,p, p[ind_0], p_dst, ind_0, pa, pm, ind_1);
    update_pm(g,p, p_dst, p[ind_0], ind_1, pa, pm, ind_0);

if (ConWt(g, ind_0,ind_1))
        swap_links(p[ind_0], p[ind_1], pa, pm);

if (ConWt(g, ind_1,ind_0))
        swap_links(p[ind_1], p[ind_0], pa, pm);

}
float fun_area_wt(float exceed, float under)
{
    /* want: no page exceeds the allotted space at all.
        if exceed is high, penalize a lot
        if exceed is a bit more than zero, we count it as one
        if a little under, it's ok
        if a lot under, something's probably kind of wrong
     */ if (under > .25*a_page)
        return (exceed+1)*(exceed+1) + under;
    else return (exceed+1)*(exceed+1);
} bool area_exceed(graph g, partition p, part_area pa,
                 page_mapping pm, int ind_0, int ind_1, float *pwt)
{
    int i, j;
    part_area pa_tmp;
    page_mapping pm_tmp;
    float exceed, under, diff;

/* copy over stuff we need */
    for (i=0; i<num_parts; i++) {
        pa_tmp[i] = pa[i];
        for (j=0; j<num_parts; j++)
            pm_tmp[i][j] = pm[i][j];
    } swap_area(g, p, pa_tmp, pm_tmp, ind_0, ind_1);

for (i=0, exceed=0., under=0.; i<num_parts; i++) {
        diff = pa_tmp[i] - a_page;
        if (diff > 0)
            exceed += diff;
        else under -= diff;
    }

*pwt = fun_area_wt(exceed, under);
    return (exceed > 0);
}

/* The swapping function swaps the given two nodes into opposite
 * partitions and updates the data structures that the swap affects
```

```
k1.c        Tue Nov 29 19:46:44 1994        6

*/
void swapping (graph g,partition p,edge_count ec,part_area pa,
               page_mapping pm, int ind_0, int ind_1, bool fArea)
{
  int tmp_i, p_dst;

/* if it's a move op...
       ind_1 == DUMMY - (page number of dst)
       So (page number of dst == DUMMY - ind_1) */ if (ind_1>DUMMY)
    p_dst = p[ind_1];
  else p_dst = DUMMY - ind_1;

if (!fArea) {
    /* we want to:
       1. move node ind_0 from p[ind_0] to p_dst;

(2. move node ind_1 from p[ind_1] to p[ind_0])
          * deduct ec[p_dst][<any node connected w/ ind_1>]
          * add to ec[p[ind_0]][<...>]
    */ update_ec (g, ec, p[ind_0], p_dst, ind_0);
    if (ind_1 > DUMMY)
      update_ec (g, ec, p_dst, p[ind_0], ind_1);
  } swap_area(g, p, pa, pm, ind_0, ind_1);

/* swap partitions */
  if (ind_1 > DUMMY) {
    tmp_i = p[ind_0];
    p[ind_0] = p[ind_1] ;
    p[ind_1] = tmp_i;
  }
  else
    p[ind_0] = p_dst;
} float edge_gain(graph g, partition p, edge_count ec, part_area pa,
                page_mapping pm, int ind_0, int ind_1, float best)
{
  float dummy;
  int p_dst;

if (area_exceed(g, p, pa, pm, ind_0, ind_1, &dummy))
    return best;   /* make sure no swap is done */ if (ind_1 <= DUMMY) {
    p_dst = DUMMY - ind_1;
    return (ec[p_dst][ind_0] - ec[p[ind_0]][ind_0]);
  } return (ec[p[ind_1]][ind_0] - ec[p[ind_0]][ind_0] +
          ec[p[ind_0]][ind_1] - ec[p[ind_1]][ind_1] -
          2*(ConWt(g,ind_1,ind_0) + ConWt(g,ind_0,ind_1)));
} float area_gain(graph g, partition p, edge_count ec, part_area pa,
                page_mapping pm, int ind_0, int ind_1, float dummy)
{
  int i;

float diff, exceed, under, new_wt;

for (i=0, exceed=0., under=0.; i<num_parts; i++) {
    diff = pa[i] - a_page;
    if (diff > 0)
      exceed += diff;
    else under -= diff;
  }
  area_exceed(g, p, pa, pm, ind_0, ind_1, &new_wt);
  return fun_area_wt(exceed, under) - new_wt;
} void pm_check(graph g, partition p, page_mapping pm)
{
  int i, j, gi, istep;
  g_node *pgn;

page_mapping pm_tmp;

for (i=0; i<num_parts; i++)
    for (j=0; j<num_parts; j++)
      pm_tmp[i][j] = 0;

for (gi=0; gi<num_info; gi++) {
    for (pgn = gi[gi].list; pgn; pgn = pgn->next) {
      /* connected from gi to pgn->gid */
      if (!num_between)
        /* gi == g2i(gi) */
        pm_tmp[p[g2i(gi)]][p[pgn->gid]]++;
      else {
        istep = off2i(g2i(gi)][p[pgn->gid]);
        pm_tmp[p[g2i(gi)]][p[istep]]++;
        for (i=1; i<num_between; i++)
          pm_tmp[p[istep]][p[++istep]]++;
        pm_tmp[p[istep]][p[g2i(pgn->gid)]]++;
      }
    }
  } for (i=0; i<num_parts; i++)
    for (j=0; j<num_parts; j++)
      assert(pm_tmp[i][j] == pm[i][j]);
}

/*
 * Finds the best pair of nodes to swap between the two halves of a partition,
 * makes the swap, and returns the improvement in cut-set size.
 */
bool next_swap(graph g, partition p, edge_count ec,
               swap_record swapped_already,
               part_area pa, page_mapping pm,
               best_swap *pbest, int par_0, int par_1, bool fArea)
{
  int i, j, ind_0, ind_1, top_0, top_1;
  float swap_val;

float (*swap_fun)(graph, partition, edge_count, part_area,
                    page_mapping, int, int, float);

if (fArea)
```

```
k1.c        Tue Nov 29 19:46:44 1994        7 swap_fun = area_gain;
  else swap_fun = edge_gain;

for (i = 0, top_0=0, top_1=0 ; i < num_nodes ; i++)
    if (!swapped_already[i]) {
      if (p[i] == par_0)
        p0[top_0++] = i;
      if (p[i] == par_1)
        p1[top_1++] = i;
    }

/* Find the best pair of nodes to swap. For now consider all N^2 pairs */

(*pbest).swap_val = (float)INT_MIN ;

/* Loop through all pairs of entries */ for (i=top_0-1; i>=0; i--) {
    ind_0 = p0[i];
    if (rg_connect[ind_0] == 0)
      continue;
    for (j=top_1-1; j >= 0 ; j--)
    {
      ind_1 = p1[j];
      if (rg_connect[ind_1] == 0)
        continue;
      assert ((p[ind_0] != p[ind_1]) &&
              (!swapped_already[ind_0]) &&
              (!swapped_already[ind_1])) ;

swap_val = (*swap_fun)(g, p, ec, pa, pm,
                             ind_0, ind_1, (*pbest).swap_val);

if (swap_val > (*pbest).swap_val) {
        (*pbest).ind_0 = ind_0 ;
        (*pbest).ind_1 = ind_1 ;
        (*pbest).swap_val = swap_val ;
      }
    }
  }
  /* now consider moves */
  for (i=top_0-1; i>=0; i--) {
    ind_0 = p0[i];
    /* no need to move dummy nodes around */
    if (rg_connect[ind_0] == 0)
      continue;

assert (!swapped_already[ind_0]);

/* considering moving node[ind_0] from par_0 to par_1.
       We know it's a move by making par_1 negative -1*/
    swap_val = (*swap_fun)(g, p, ec, pa, pm, ind_0,
                           DUMMY-par_1, (*pbest).swap_val);

if(swap_val > (*pbest).swap_val) {
      (*pbest).ind_0 = ind_0;
      (*pbest).ind_1 = DUMMY - par_1;
      (*pbest).swap_val = swap_val;
    }
  } for (i=top_1-1; i>=0; i--) {
    ind_1 = p1[i];
    /* no need to move dummy nodes around */
    if (rg_connect[ind_1] == 0)
      continue;

assert (!swapped_already[ind_1]);

/* considering moving node[ind_0] from par_1 to par_0.
       We know it's a move by making par_0 negative -1*/
    swap_val = (*swap_fun)(g, p, ec, pa, pm,
                           ind_1, DUMMY-par_0, (*pbest).swap_val);

if(swap_val > (*pbest).swap_val) {
      (*pbest).ind_0 = ind_1;
      (*pbest).ind_1 = DUMMY - par_0;
      (*pbest).swap_val = swap_val;
    }
  } if ((*pbest).swap_val == INT_MIN) {
    return FALSE;
  } swapping(g, p, ec, pa, pm, (*pbest).ind_0, (*pbest).ind_1, fArea);

ifdef DEBUG
  pm_check(g, p, pm);
endif swapped_already[(*pbest).ind_0] = TRUE ;
  if ((*pbest).ind_1 > DUMMY)
    swapped_already[(*pbest).ind_1] = TRUE ;

return TRUE ;
} void print_partitions(partition p, part_area pa, page_mapping pm)
{
  int i, j;

for (j=0; j<num_parts; j++) {
    /* if nothing on this parition, continue */
    if (pa[j] < 0.001)
      continue;

fprintf (fpout, "Total area occupied for partition %d: %6.2f\n", j, pa[j]);

/* print all nodes on this page */
    for (i=0; i<num_nodes; i+=(i+interval))
      if ((p[i] == j) && (rg_info[i].id > DUMMY))
        fprintf (fpout, "        %d\n", rg_info[i].id);

/* now print all connections from this page out */
    for (i=0; i<num_parts; i++)
      if (pm[j][i] && (i != j))
        fprintf (fpout, "        Connects to partition %d\n", i);
  }
  fprintf (fpout, "\n");
  fprintf (fpout,"*****************************************************\n");
} void ltoa(int n, char *s, bool fgf)
{
  char buff[MAX_LEN];
```

```
kl.c        Tue Nov 29 19:46:44 1994        8 int j, l=0;

do{
        buff[l++] = n%10 + '0';
    }while((n/=10)>0);

for(j=0; j<l; j++)
        s[j] = buff[l-j-1];
    s[j] = '\0';
    if (fgif)
        strncat(s,".gif", 4);
} void make_mosaic(partition p, part_area pa, page_mapping pm)
{
    int i, j;
    FILE *fp;
    char partfile[MAX_LEN], *pc_part;
    char imgfile[MAX_LEN], *pc_img;

strcpy (partfile, "partition");
    pc_part = partfile+strlen(partfile);
    strcpy (imgfile, "infosrc");
    pc_img = imgfile+strlen(imgfile);

for (j=0; j<num_parts; j++) {
        if (pa[j] == 0.)
            continue;

ltoa(j,pc_part, FALSE);
        assert (fp = fopen (partfile, "w"));

fprintf (fp, "<TITLE>%s</TITLE>\n", partfile);

for (i=0; i<num_nodes; i+=(1+interval))
            if ((p[i] == j) && (rg_info[i].id > DUMMY)) {
                ltoa(rg_info[i].id, pc_img, TRUE);
                fprintf (fp, "<img align=top src=%s>\n", imgfile);
                fprintf (fp, "<p>\n");
            } for (i=0; i<num_parts; i++) {
            if (pm[j][i] && (i != j)) {
                ltoa(i,pc_part, FALSE);
                fprintf (fp, "<A HREF=\"%s\"> Connections to %s </A>\n",
                        partfile ,partfile);
                fprintf (fp, "<p>\n");
            }
        }
        fclose(fp);
    }
}

/*
 * Kernighan-Lin heuristic for improving an existing partition.
 * See Mazlish et al. for a good description of the algorithm.
 */
bool kl(g, p, ec, pa, par_0, par_1, pm, fArea)
    graph g ;
    partition p ;
    edge_count ec ;
    part_area pa;
    int par_0;
```

```
    int par_1;
    page_mapping pm;
    bool fArea;     /* dictates which search function to use */
{
    int i, j, k;
    float cum_swap_val_total, max_cum_swap_val ;

bool fcont;
    bool fRet = FALSE;   /* returns true if anything got swapped here */
    partition p_tmp;
    edge_count ec_tmp;
    part_area pa_tmp;
    page_mapping pm_tmp;
    swap_record swap_rec ;
    best_swap *rg_best;

#ifdef DEBUG
    edge_count ec_dbg;
#endif
    assert (swap_rec = (swap_record)calloc(num_nodes, sizeof(bool)));
    assert (rg_best = (best_swap *)calloc(num_nodes, sizeof(best_swap)));

if (!fArea) {
        ec_tmp = alloc_ec();
#ifdef DEBUG
        ec_dbg = alloc_ec();
        assert (ec_dbg);
#endif
        assert(ec_tmp);
    } p_tmp = alloc_part();
    assert(p_tmp);

do
    {
        /* Copy current partition information. */
        for (i=0; i<num_nodes; i++) {
            p_tmp[i] = p[i];
            swap_rec[i] = FALSE ;
            if (!fArea)
                for (j=0; j<num_parts; j++) {
                    ec_tmp[j][i] = ec[j][i] ;
                }
        } for (i=0; i<num_parts; i++) {
            pa_tmp[i] = pa[i];
            for (j=0; j<num_parts; j++)
                pm_tmp[i][j] = pm[i][j];
        } fcont = TRUE;

/* ensure that we don't have round error */
        cum_swap_val_total = 0.0000001;
        max_cum_swap_val = 0.01;

k = -1 ;

for (i=0; i<num_nodes; i++) {
            fcont = next_swap(g, p_tmp, ec_tmp, swap_rec,
                            pa_tmp, pm_tmp, &rg_best[i],
```

```
kl.c        Tue Nov 29 19:46:44 1994        9 par_0, par_1, fArea);
        if (!fcont)  /* no more swappings are available, quit now */
            break;
        cum_swap_val_total += rg_best[i].swap_val ;
        if ((cum_swap_val_total - max_cum_swap_val) > 0.01)
        {
            k = i ;
            max_cum_swap_val = cum_swap_val_total ;
        }
    }

/* Make best sequence 0...k of swaps. */
    if (k >= 0) {
        for (i=0 ; i<=k; i++)
            swapping(g, p, ec, pa, pm, rg_best[i].ind_0,
                     rg_best[i].ind_1, fArea) ;
        fRet = TRUE;

if (!fArea) {
            fprintf (fpout, "        number of move operations: %d\n", k+1);
            fprintf (fpout, "        gain: %f\n\n", max_cum_swap_val);
        }
#ifdef DEBUG
        if (!fArea) {
            for (i=0;i<num_nodes; i++)
                for (j=0;j<num_parts; j++)
                    ec_dbg[j][i] = 0;   /* init */
            init_ec_info(g, p, ec_dbg);
            for (i=0;i<num_nodes; i++)
                for (j=0;j<num_parts; j++)
                    assert (abs(ec_dbg[j][i] - ec[j][i]) == 0);
        }
#endif
    }
    } while (k >= 0) ;

if (!fArea) {
        free_ec(ec_tmp);
#ifdef DEBUG
        free_ec(ec_dbg);
#endif
    } free_part(p_tmp);

assert (rg_best);
    free(rg_best);

assert(swap_rec);
    free(swap_rec);

return fRet;
} bool main()
{
    graph g;
    partition p;
    part_area pa;
    edge_count ec;
    page_mapping pm;
    int i, j, pass, count;
    char filename[MAX_LEN];

printf ("Enter output file name\n");
    gets(filename);
    assert ((fpout = fopen(filename, "w")));
    setbuf(fpout, NULL);
    global_init(&g, &p, &ec);

/* if failed to generate initial partition */
    if (!random_partition(g, p, ec, pa, pm))
        return FALSE;                       /* declare failure */

/* otherwise, move onto the edge optimization phase */
    fprintf (fpout, "\n");
    fprintf (fpout,"Running KL for edge optimization\n");

fprintf (fpout,"****************************************************\n");
    pass = 0;
    do {
        fprintf (fpout,"Pass #%d\n", ++pass);
        fprintf (fpout,"****************************************************\n");
        for (i=0, count=0; i<num_parts; i++)
            for (j=i+1; j<num_parts; j++) {
                fprintf (fpout, "Considering partitions %d %d\n", i, j);
                if (kl(g, p, ec, pa, i, j, pm, FALSE)) {
                    count++;
#ifdef DEBUG
                    print_partitions(p, pa, pm);
#endif
                }
            }
    } while (count > 0);
    print_partitions(p, pa, pm);
    make_mosaic(p, pa, pm);
    return TRUE;
}
```

```
gp.h            Tue Nov 29 19:48:35 1994          1
/*
 * Experimental heuristics for graph partitioning: include file.
 * Owner: Joe Marks
 * History: Created, 6/15/94
 *          Last revised, 7/6/94
 * Modified by: Rebecca Hwa
 *          Last revised 8/12/94
 */

/*
 * Constant and macro definitions.
 */ define TRUE            1
define FALSE           0

/* we're now turning off debug mode */
define DEBUG           FALSE define RAND_SEED       ((long int)1313)
define rand_int(x,y)   ((int)((x) + ((y) - (x) + 1) * drand48()))
#define rand_01         drand48()

#define MAX_N           100   /* Maximum number of info arcs allowed */

/*
 * RH: some additional macros to help converting
 * between two different indexing scheme:
 *     graph indexing (index of info item on our representation of graph)
 *     info  indexing (index of node number for every node)
 */
/* converting between index for the graph structure and index for the
   info structures */ define g2i(x)          ((x)*(interval+1))
define i2g(x)          ((x)/(interval+1))

/* x is the info index of the src, y is the graph index of
   the dst, off2is returns the info index of the first
   stepping node from src to dst */
#define off2is(x,y)     ((x)+(y)*num_between + 1)

/* x is the info index of some node. We check to see if it
   is an info node */
#define is_i_info(x)    (((x)%(1+interval)) ? FALSE: TRUE)

/* given info index of a step node(x), and the info index of
   its info src node(y), find out the graph index of the
   node that it's going */
#define is2gd(x,y)      ((x-y-1)/num_between)

/* search: x is a pointer, y is the gid */
#define gi_search(x,y)  for(;(x && (x->gid!= y)) ;x=x->next)

/* Given graph g, determines if there is a path between x
   (graph indexed) and y (graph indexed) and return the path
   cost */
#define path_wt(g,x,y)  (ConWt(g, g2i(x), off2is(g2i(x),y)))

/* Maximum number of emergency scripts allowed */
define MAX_E_SCRIPT    20 define MAX_LEN 80
define ERROR   -1
define START   -1 define MAX_PARTS    10   /* max number of partitions */
define MAX_BETWEEN  3    /* max number of intermediary nodes */
#define DUMMY        -1   /* for unequal partitioning */
#define BETWEEN      -2   /* for intermediary nodes */

/*
 * Typedefs.
 */ typedef char bool ;

/* amount of area used up in a partition. */
typedef float part_area[MAX_PARTS];

/* records what pages are connected to each other */
typedef int page_mapping[MAX_PARTS][MAX_PARTS];

/* Number of edges from individual nodes
   to nodes in the indicated partition.

RH: In the case of directed graphs also
   include: # of edges 'to' individual nodes
   from nodes in the indicated partition.

RH: for weighted edge, each edge count
   is multiplied by its weight factor

RH: actually, let's dynamically allocate the space as needed*/
typedef float **edge_count;

/* list representation of graphs */
typedef struct _g_node
{
    int gid;
    float weight;
    struct _g_node *next;
} g_node;

typedef struct _glist
{
    int count;
    g_node *list;
} glist;

typedef glist *graph;

/* Records partition assignment for each node. */
typedef int *partition;

/* Records if a node has been swapped. */
typedef bool *swap_record;

typedef struct _best_swap
{
    int ind_0;
    int ind_1;
    float swap_val;
} best_swap;

/*
```

We claim:

1. Apparatus for allocating display items to each page of a hypermedia document containing display items that are to be laid out on several linked pages, comprising:

means for automatically allocating said display items of said document to said pages by automatically specifying the assignment of said display items to each page by using a reduction to graph partitioning and an optimization technique for said graph partitioning and for automatically creating linkages between said pages including means for reducing said assigned display items and linkages to a graph partition to provide an optimized graph partition specifying assignments of display items and linkages, whereby a convenient document structure is automatically provided in which linkages and page content are automatically created, thus eliminating the necessity for the author to pre-specify page content or linkage structure.

2. The Apparatus of claim 1 wherein said assigning means includes means for providing a list of display items, edges between display items and a numeric value corresponding to the importance thereof.

3. The Apparatus of claim 2 wherein said numeric value relates to the importance of said edges, thereby to permit said assignment of display items to pages and determination of pages to be linked.

4. The Apparatus of claim 1 wherein said display items include text.

5. The Apparatus of claim 1 wherein said display items include graphics.

6. The Apparatus of claim 1, wherein said graph partition includes stepping-stone nodes which divide one of said edges into two edges.

7. The Apparatus of claim 6, wherein said stepping-stone nodes divide up existing edges in said graph prior to partitioning.

8. The Apparatus of claim 1 wherein one of said means for optimizing includes means for performing a Kernighan-Lin graph partition.

* * * * *